US011572432B2

(12) United States Patent
Shin et al.

(10) Patent No.: US 11,572,432 B2
(45) Date of Patent: Feb. 7, 2023

(54) POLYTHIOURETHANE-BASED PLASTIC LENS

(71) Applicant: SKC CO., LTD., Gyeonggi-do (KR)

(72) Inventors: Junghwan Shin, Gyeonggi-do (KR); Jung Hwan Myung, Gyeonggi-do (KR); Jongmin Shim, Gyeonggi-do (KR); Hyuk Hee Han, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 91 days.

(21) Appl. No.: 16/960,492

(22) PCT Filed: Jan. 11, 2019

(86) PCT No.: PCT/KR2019/000462
§ 371 (c)(1),
(2) Date: Jul. 7, 2020

(87) PCT Pub. No.: WO2019/139410
PCT Pub. Date: Jul. 18, 2019

(65) Prior Publication Data
US 2020/0339731 A1    Oct. 29, 2020

(30) Foreign Application Priority Data

Jan. 12, 2018    (KR) .................. 10-2018-0004259

(51) Int. Cl.
| C08G 18/38 | (2006.01) |
| C08G 18/75 | (2006.01) |
| C08G 18/76 | (2006.01) |
| G02B 1/04 | (2006.01) |
| C08G 18/64 | (2006.01) |

(52) U.S. Cl.
CPC ..... *C08G 18/3876* (2013.01); *C08G 18/3855* (2013.01); *C08G 18/6453* (2013.01); *C08G 18/757* (2013.01); *C08G 18/7642* (2013.01); *G02B 1/041* (2013.01)

(58) Field of Classification Search
CPC .............. C08G 18/3876; C08G 18/737; C08G 18/7642; C08G 18/3855; C08G 18/6453; G01B 1/041
See application file for complete search history.

(56) References Cited

U.S. PATENT DOCUMENTS

| 2012/0157651 A1* | 6/2012 | Chen .................. C08G 18/3876 528/56 |
| 2014/0296431 A1* | 10/2014 | Kousaka .............. C08G 18/757 524/710 |
| 2016/0304701 A1* | 10/2016 | Kakinuma .......... C08K 5/3475 |
| 2017/0009002 A1 | 1/2017 | Tsukada et al. |
| 2019/0010273 A1* | 1/2019 | Kousaka ................ G02B 1/041 |

FOREIGN PATENT DOCUMENTS

| KR | 10-2007-0020453 A | 2/2007 |
| KR | 10-2013-0020804 A | 2/2013 |
| KR | 10-1363198 B1 | 2/2014 |
| KR | 10-2015-0002856 A | 1/2015 |
| KR | 10-2017-0046762 A | 5/2017 |
| WO | 2013/032010 A1 | 3/2013 |
| WO | 2016/031975 A1 | 3/2016 |

OTHER PUBLICATIONS

Office Action issued by the Japanese Patent Office dated Jul. 27, 2021.

* cited by examiner

*Primary Examiner* — Rabon A Sergent
(74) *Attorney, Agent, or Firm* — IP & T Group LLP

(57) ABSTRACT

Embodiments relate to a polythiourethane-based plastic lens. When a polythiourethane-based plastic lens is polymerized according to the embodiment, the types, contents, and the like of the polythiol compounds and the isocyanate compounds are adjusted to control the storage moduli at room temperature and high temperatures, their variations, the energy attenuation (KEL) obtained therefrom, and the glass transition temperature, whereby the polythiourethane-based plastic lens thus obtained is enhanced in impact resistance and thermal resistance.

4 Claims, 1 Drawing Sheet

[Fig. 1]
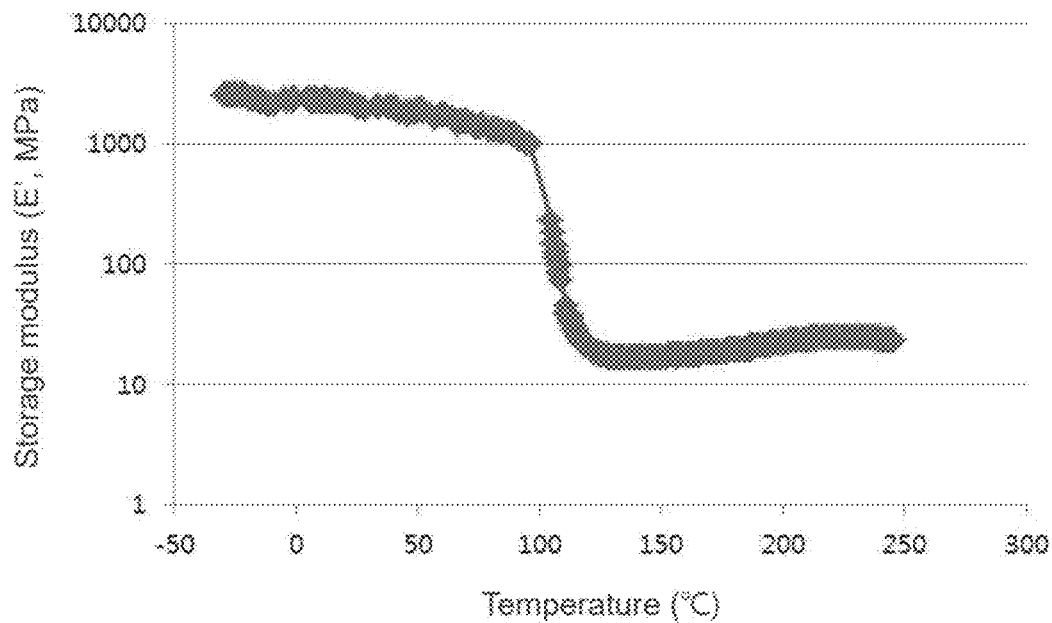
[Fig. 2]
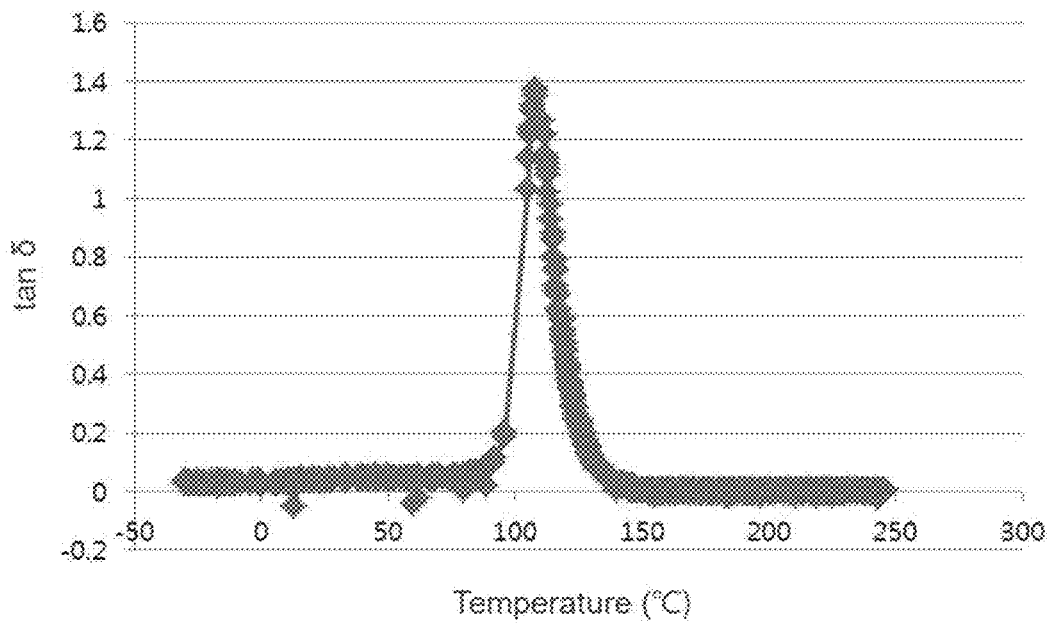

POLYTHIOURETHANE-BASED PLASTIC LENS

This application is a national stage application of PCT/KR2019/000462 filed on Jan. 11, 2019, which claims priority of Korean patent application numbers 10-2018-0004259 filed on Jan. 12, 2018. The disclosure of each of the foregoing applications is incorporated herein by reference in its entirety.

TECHNICAL FIELD

Embodiments relate to a polythiourethane-based plastic lens.

BACKGROUND ART

Since plastics optical materials are lightweight, hardly breakable, and excellent in dyeability as compared with optical materials made of inorganic materials such as glass, plastic materials of various resins are widely used as optical materials for eyeglass lenses, camera lenses, and the like. In recent years, there has been an increased demand for higher performance of optical materials, particularly in terms of high transparency, high refractive index, low specific gravity, high thermal resistance, high impact resistance, and the like.

Polythiourethane-based compounds are widely used as optical materials by virtue of their excellent optical characteristics and mechanical properties. A polythiourethane-based compound may be prepared by reacting a polythiol compound and an isocyanate compound. The physical properties of the polythiol compound and the isocyanate compound significantly affect the physical properties of the polythiourethane-based compound to be prepared.

Specifically, the refractive index of an optical lens prepared from a polythiourethane-based compound can be increased by adjusting the structure of the monomers and/or the content of sulfur, and the like. Appropriate design of the contents and types of the monomers can enhance the impact resistance as compared with other plastic-based materials for lenses including acrylic-based materials.

In recent years, studies have been conducted to enhance the impact resistance of polythiourethane-based optical materials by introducing ester groups, which are flexible groups, into thiol-based compounds. For example, Korean Patent No. 10-1363198 discloses a technique for producing a pentaerythritol mercaptocarboxylic acid ester by introducing an ester group to a polythiol. In this patent, however, the polythiol contains a small amount of an ester group, which limits the improvement of impact resistance.

In addition, if the composition is designed to enhance the impact resistance only, its thermal resistance is insufficient, resulting in a deformation of the lens due to the heat in the subsequent process such as coating or coloring after the casting of a lens. In addition, a problem arises from the viewpoint of long-term reliability since the focal length of the lens is distorted when the lens is exposed for a long period of time in midsummer or to high-temperature environmental conditions.

DETAILED DESCRIPTION OF THE INVENTION

Technical Problem

Accordingly, embodiments aim to provide a polythiourethane-based plastic lens that is excellent in both thermal resistance and impact resistance.

Solution to the Problem

An embodiment provides a polythiourethane-based plastic lens obtained from a polymerizable composition comprising a bi- or higher-functional polythiol compound and a bi- or higher-functional isocyanate compound, wherein the lens has (i) a ratio of the storage modulus at room temperature (25° C.) to the storage modulus at 70° C. of 1 to 10, (ii) a storage modulus at room temperature (25° C.) of 100 to 3,000 MPa, (iii) an energy attenuation (KEL) at room temperature (25° C.) according to the following Equation 1 of 1 to 50, and (iv) a glass transition temperature (Tg) of 70 to 160° C.

$$KEL \text{ (energy attenuation)} = \tan \delta \times 10^{12}/[E'(@25°\text{ C.}) \times (1+(\tan \delta)^2)] \quad \text{[Equation 1]}$$

In the above equation, E' (@ 25° C.) is the storage modulus at room temperature (25° C.), and tan δ is the ratio of the loss modulus to the storage modulus at room temperature (25° C.).

Advantageous Effects of the Invention

When a polythiourethane-based plastic lens is polymerized according to the embodiment, the types, contents, and the like of the polythiol compound and the isocyanate compound are adjusted to control the storage moduli at room temperature and high temperatures, their variations, the energy attenuation (KEL) obtained therefrom, and the glass transition temperature, so that the polythiourethane-based plastic lens thus obtained is enhanced in impact resistance and thermal resistance.

BRIEF DESCRIPTION OF THE DRAWINGS

FIG. 1 is a graph showing storage modulus with respect to temperature.

FIG. 2 is a graph showing tan δ with respect to temperature.

BEST MODE FOR CARRYING OUT THE INVENTION

The polythiourethane-based plastic lens according to an embodiment is obtained from a polymerizable composition comprising a bi- or higher-functional polythiol compound and a bi- or higher-functional isocyanate compound, wherein the lens has (i) a ratio of the storage modulus at room temperature (25° C.) to the storage modulus at 70° C. of 1 to 10, (ii) a storage modulus at room temperature (25° C.) of 100 to 3,000 MPa, (iii) an energy attenuation (KEL) at room temperature (25° C.) according to the following Equation 1 of 1 to 50, and (iv) a glass transition temperature (Tg) of 70 to 160° C.

$$KEL \text{ (energy attenuation)} = \tan \delta \times 10^{12}/[E'(@25°\text{ C.}) \times (1+(\tan \delta)^2)] \quad \text{[Equation 1]}$$

In the above equation, E' (@ 25° C.) is the storage modulus at room temperature (25° C.), and tan δ is the ratio of the loss modulus to the storage modulus at room temperature (25° C.).

The KEL value may be defined as energy per unit volume lost in each deformation according to ASTM D4092-90 (Standard Terminology Relating to Dynamic Mechanical Measurements of Plastics).

In the polythiourethane-based plastic lens, the ratio of the storage moduli (E' (@25° C.)/E' (@ 70° C.)) at room temperature (25° C.) and 70° C. is 1 to 10, 1 to 8, or 1 to 5. Further, the storage modulus of the lens at room temperature (25° C.) may be 100 to 3,000 MPa, 100 to 2,800 MPa. or 100 to 2,500 MP (see Test Example (1)). In addition, the glass transition temperature (Tg) of the lens may be 70 to 160° C., 70 to 150° C., 80 to 120° C. or 90 to 115° C. (see Test Example (2)). The smaller the difference between the moduli before the glass transition temperature (Tg) is, the more the impact resistance of the lens may be enhanced. Thus, it is important to have a modulus value within the range.

In addition, in the polythiourethane-based plastic lens, the KEL value at room temperature (25° C.) according to Equation 1 may be 1 to 50, 1 to 40, 1 to 30, 1 to 20, or 5 to 20 (see Test Example (1)). Within the above range, the impact resistance of the lens may be further enhanced. Specifically, the larger the KEL value of a lens, the greater the energy that the lens absorbs and dissipates, so that it is not readily destroyed by external impact. In general, the KEL value is increased as the lens is softened. To this end, the average number of functional groups in the polymerizable composition may be lowered, or a crosslinking density may be adjusted by selecting a monomer having a large molecular weight. However, if it is excessively softened, the thermal resistance of the lens becomes insufficient, so that the lens is likely to be deformed in the subsequent process such as coating or coloring, and a problem may arise that the focal length of the lens is distorted when the lens is exposed to high temperatures. Thus, it is important that it has a KEL value within the above range.

Accordingly, as described above, a lens should be designed such that the storage moduli at room temperature, at the temperature when the lens is prepared, and at the temperature for use are maintained at a certain value or more, as well as the changes in the storage modulus before the glass transition temperature is at a certain level or lower. In addition, the glass transition temperature should be high enough not to affect the subsequent process, and it is important to have a KEL value within the above range.

The polythiol compound may contain a plurality of a sulfur atom. It may be a bi- or higher-functional, or bifunctional to tetrafunctional, polythiol compound. The polythiol compound may have a weight average molecular weight of 200 to 3,000 g/mole or 220 to 2,000 g/mole. Within the above range, the molecular weight between the crosslinking points, that is, the crosslinking density can be adjusted within a required range, and an appropriate level of viscosity is secured when a lens is cast, which enhances the workability. Thus, the yield can be increased when the lens is prepared.

The polythiol compound may be prepared by a known method, and a commercially available product may be purchased to be used.

The polythiol compound may be at least one selected from the group consisting of 1,9-dimercapto-3,7-dithianonane, 1,13-dimercapto-3,7,11-trithiatridecane, glycol di(3-mercaptopropionate), 1,4-dithiane-2,5-diyldimethanethiol, 4-mercaptomethyl-1,8-dimercapto-3,6-dithiaoctane, 2-mercaptomethyl-1,5-dimercapto-3-thiapentane, trimethylolpropane tri(3-mercaptopropionate), 4,8-di(mercaptomethyl)-1,11-dimercapto-3,6,9-trithiaundecane, 5,9-di(mercaptoethyl)-1,12-dimercapto-3,7,10-trithiadodecane, pentaerythritol tetra(3-mercaptopropionate), pentaerythritol tetra(mercaptoacetate),

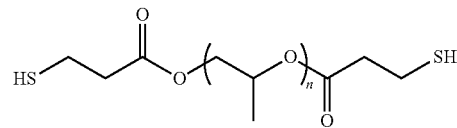

(n is a rational number from 9 to 12), and

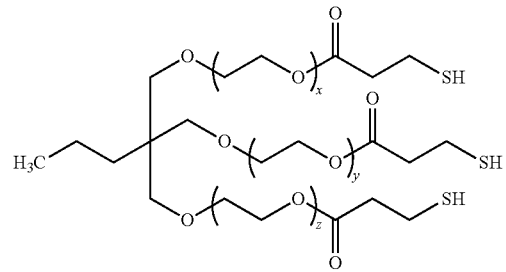

(x, y, and z are each independently an integer from 1 to 10, and x+y+z=20).

Specifically, the polythiol compound may be at least one selected from the group consisting of glycol di(3-mercaptopropionate), 1,4-dithiane-2,5-diyldimethanethiol, 4-mercaptomethyl-1,8-dimercapto-3,6-dithiaoctane, trimethylolpropane tri(3-mercaptopropionate), 4,8-di(mercaptomethyl)-1,11-dimercapto-3,6,9-trithiaundecane, 5,9-di(mercaptoethyl)-1,12-dimercapto-3,7,10-trithiadodecane, pentaerythritol tetra(3-mercaptopropionate), pentaerythritol tetra(mercaptoacetate), and

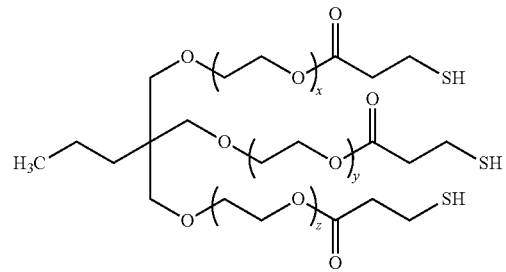

(x, y, and z are each independently an integer from 1 to 10, and x+y+z=20).

More specifically, the polythiol compound may be divided into first and second polythiol compounds depending on the presence or absence of an ester group and the molecular weight. Specifically, the first polythiol compound may be a polythiol compound different from the second polythiol compound, and it may have a weight average molecular weight of 200 to 1,500 g/mole or 220 to 1,400 g/mole. The second polythiol compound has an ester group at the terminal and may have a weight average molecular weight of 400 g/mole or more, 400 to 3,000 g/mole, or 400 to 2,000 g/mole.

For example, the first polythiol compound may be at least one selected from the group consisting of glycol di(3-mercaptopropionate), 1,4-dithiane-2,5-diyldimethanethiol, 4-mercaptomethyl-1,8-dimercapto-3,6-dithiaoctane, trimethylolpropane tri(3-mercaptopropionate), 4,8-di(mercaptomethyl)-1,11-dimercapto-3,6,9-trithiaundecane, and 5,9-di(mercaptoethyl)-1,12-dimercapto-3,7,10-trithiadodecane. Further, the second polythiol compound may be at least one selected from the group consisting of pentaerythritol tetra(3-mercaptopropionate), pentaerythritol tetra(mercaptoacetate), and

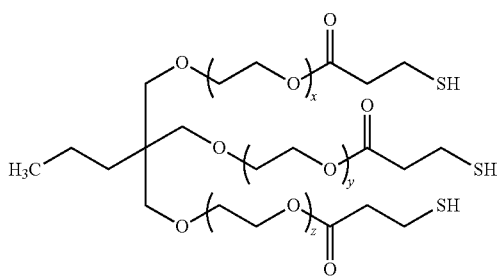

(x, y, and z are each independently an integer from 1 to 10, and x+y+z=20).

The first polythiol compound may be employed in an amount of 45 to 70 parts by weight or 50 to 70 parts by weight, and the second polythiol compound is employed in an amount of 50 to 75 parts by weight or 55 to 75 parts by weight, based on the total weight of the polythiol compound. Within the above content ranges, a more transparent lens can be prepared, and it is more advantageous from the viewpoint of thermal resistance and impact resistance.

The isocyanate compound may be a bi- or higher-functional, or bifunctional to tetrafunctional, isocyanate compound. The isocyanate compound may have a weight average molecular weight of 150 to 510 g/mole, 160 to 505 g/mole, or 160 to 500 g/mole. Within the above range, the crosslinking density and viscosity are adjusted to an appropriate level, whereby the lens preparation yield can be enhanced.

The isocyanate compound may be at least one selected from the group consisting of isophorone diisocyanate, 1,6-diisocyanatohexane, 1,3-bis(isocyanatomethyl)cyclohexane, bis(4-isocyanatocyclohexyl)methane, m-xylene diisocyanate, and 1,3,5-tris(6-isocyanatohexyl)-1,3,5-triazinane-2,4,6-trione.

Specifically, the isocyanate compound may be at least one selected from the group consisting of 1,6-diisocyanatohexane, 1,3-bis(isocyanatomethyl)cyclohexane, m-xylene diisocyanate, and 1,3,5-tris(6-isocyanatohexyl)-1,3,5-triazinane-2,4,6-trione.

According to an embodiment, the polythiol compound may be bifunctional to tetrafunctional and may have a weight average molecular weight of 200 to 3,000 g/mole or 220 to 2,000 g/mole, and the isocyanate compound may be bifunctional to tetrafunctional and may have a weight average molecular weight of 150 to 510 g/mole, 160 to 505 g/mole, or 160 to 500 g/mole.

According to an embodiment, the polythiol compound may be bifunctional to tetrafunctional and may have a weight average molecular weight of 200 to 1,500 g/mole or 220 to 1,400 g/mole, and the isocyanate compound may be bifunctional to tetrafunctional and may have a weight average molecular weight of 150 to 510 g/mole, 160 to 505 g/mole, or 160 to 500 g/mole.

According to an embodiment, the polythiol compound may be a second polythiol compound, which has an ester group at the terminal, has a weight average molecular weight of 400 g/mole or more, 400 to 3,000 g/mole, or 400 to 2,000 g/mole, and is bifunctional to tetrafunctional, and a first polythiol compound, which is different from the second polythiol compound, has a weight average molecular weight of 200 to 1,500 g/mole or 220 to 1,400 g/mole, and is bifunctional to tetrafunctional; and the isocyanate compound may be bifunctional to tetrafunctional and may have a weight average molecular weight of 150 to 510 g/mole, 160 to 505 g/mole, or 160 to 500 g/mole.

The polymerizable composition may comprise a polythiol compound and an isocyanate compound at a molar ratio of 20:80 to 80:20. Further, the polymerizable composition may have an (NCO)/(OH+SH) equivalent ratio (i.e., the molar ratio of the functional groups) of 0.8 to 1.2, 0.9 to 1.1, or 1 to 1.1. Within the above ranges, the dimensional stability of the cured product can be ensured, the reaction rate can be controlled, whereby the appearance defects can be suppressed, and an appropriate curing density can be maintained, whereby the thermal resistance and strength can be enhanced.

The polymerizable composition may further comprise such additives as an internal mold release agent, a heat stabilizer, a reaction catalyst, an ultraviolet absorber, and a blueing agent, depending on the purpose thereof.

As the ultraviolet absorber, at least one of benzophenone-based, benzotriazole-based, salicylate-based, cyanoacrylate-based, oxanilide-based, and the like may be used.

Examples of the internal mold release agent include a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexyldodecylammonium salt; and an acidic phosphate ester. It may be used alone or in combination of two or more.

As the reaction catalyst, a known reaction catalyst used in the production of a polythiourethane-based resin may be appropriately used. For example, it may be at least one selected from the group consisting of a dialkyltin halide such as dibutyltin dichloride and dimethyltin dichloride; a dialkyltin dicarboxylate such as dimethyltin diacetate, dibutyltin dioctanoate, and dibutyltin dilaurate; a dialkyltin dialkoxide such as dibutyltin dibutoxide and dioctyltin dibutoxide; a dialkyltin di(thioalkoxide) such as dibutyltin di(thiobutoxide); a dialkyltin oxide such as di(2-ethylhexyl)tin oxide, dioctyltin oxide, and bis(butoxy dibutyltin) oxide; and a dialkyltin sulfide such as dibutyltin sulfide. Specifically, it may be at least one selected from the group consisting of a dialkyltin halide such as dibutyltin dichloride, dimethyltin dichloride, and the like.

As the heat stabilizer, at least one of a metal fatty acid salt, a phosphorus compound, a lead compound, or an organotin compound may be used.

The blueing agent has an absorption band in the wavelength range from orange to yellow in the visible light region and has a function of adjusting the color of an optical material made of a resin. Specifically, the blueing agent may comprise a material that exhibits blue to violet color, but it is not particularly limited thereto. Examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more. In view of the solubility in the polymerizable composition and the transparency of the optical material to be produced, a dye is preferably used as the blueing agent. From the viewpoint of the absorption wavelength, the dye may particularly have a maximum absorption wavelength of 520 to 600 nm; and more particularly, a maximum absorption wavelength of 540 to 580 nm. In addition, in terms of the structure of the compound, an anthraquinone-based dye is preferable as the dye. The method of adding the blueing agent is not particularly limited, and the blueing agent may be added to the monomers in advance. Specifically, various methods can be used; for example, the blueing agent may be dissolved in the monomers or may be contained in a master solution in a high concentration, the master solution being later diluted with the monomers or other additives and then added.

In an embodiment, the polymerizable composition as described above may be thermally cured in a mold to prepare a polythiourethane-based plastic lens.

Specifically, the polymerizable composition is degassed under reduced pressures, filtered, and then injected into a mold for molding a lens. Such degassing and mold injection may be carried out in a temperature range of, for example, 10 to 40° C. for 10 to 60 minutes. Once the composition has been injected into the mold, polymerization is usually carried out by gradually heating the composition from a low temperature to a high temperature. The polymerization temperature may be, for example, 10 to 150° C., particularly 25 to 120° C.

The filtered polymerizable composition may be injected into a glass mold assembled with an adhesive tape using nitrogen pressure. The glass mold into which the composition is injected may be subjected to polymerization by raising the temperature stepwise in a forced circulation oven. Specifically, after the temperature is raised from 25° C. to 120° C. at a rate of 5° C./min, it may be polymerized at 120° C. for 18 hours, further cured at 130° C. for 4 hours, and released from the glass mold to obtain a plastic lens.

The polythiourethane-based plastic lens may have various shapes by changing the mold used in the preparation thereof. Specifically, it may be in the form of an eyeglass lens, a camera lens, or the like. Specifically, the eyeglass lens prepared by the above process may have various center thicknesses according to a user's preference.

The molar ratio of the polythiol compound and the isocyanate compound in the polymerization reaction may be 0.5:1 to 1.2:1 or 0.5:1 to 1.1:1.

If required, the polythiourethane-based plastic lens may be subjected to physical or chemical treatment such as surface polishing, antistatic treatment, hard coat treatment, anti-reflection coat treatment, dyeing treatment, and dimming treatment for the purpose of imparting thereto antireflection, hardness, abrasion resistance, chemical resistance, anti-fogging, or fashionity.

As described above, when a polythiourethane-based plastic lens is polymerized according to the embodiment, the types, contents, and the like of the polythiol compound and the isocyanate compound are adjusted to control the storage moduli at room temperature and high temperatures, their variations, the energy attenuation (KEL) obtained therefrom, and the glass transition temperature, whereby the polythiourethane-based plastic lens thus obtained is enhanced in impact resistance and thermal resistance.

MODE FOR CARRYING OUT THE INVENTION

Hereinafter, the present invention is explained in detail by Examples. The following Examples are intended to further illustrate the present invention without limiting its scope.

EXAMPLE

The polythiol compound and the isocyanate compound used in the following examples were those shown in Tables 1 and 2 below.

TABLE 1

| | Polythiol compound | Molecular weight (MW) | No. of functional groups (F) | Equivalent (EQ) | Sulfur content (%) |
|---|---|---|---|---|---|
| 1 | Glycol di(3-mercaptopropionate) | 238.3 | 2 | 119.2 | 26.9 |
| 2 | 1,4-dithiane-2,5-diyldimethanethiol | 212 | 2 | 106.0 | 60.4 |
| 3 | 4-mercaptomethyl-1,8-dimercapto-3,6-dithiaoctane | 260 | 3 | 86.7 | 61.5 |

TABLE 1-continued

| | Polythiol compound | Molecular weight (MW) | No. of functional groups (F) | Equivalent (EQ) | Sulfur content (%) |
|---|---|---|---|---|---|
| 4 | 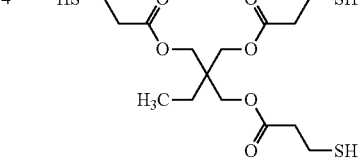<br>Trimethylolpropane tri(3-mercaptoproprionate) | 398.6 | 3 | 132.9 | 24.1 |
| 5 | 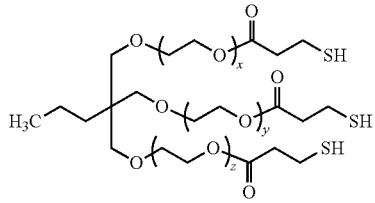<br>($x$, $y$, and $z$ are each independently an integer from 1 to 10, and $x + y + z = 20$) | 1,300 | 4 | 325.0 | 7.4 |
| 6 | 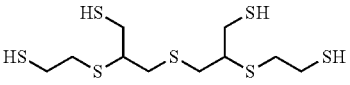<br>4,8-di(mercaptomethyl)-1,11-dimercapto-3,6,9-trithiaundecane | 366 | 4 | 91.5 | 61.2 |
| 7 | 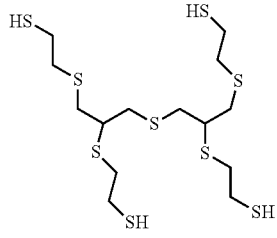<br>5,9-di(mercaptoethyl)-1,12-dimercapto-3,7,10-trithiadodecane | 486 | 4 | 121.5 | 59.3 |
| 8 | 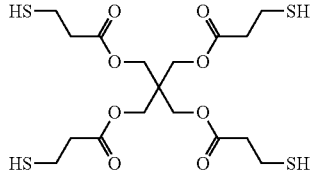<br>Pentaerythritol tetra(3-mercaptopropionate) | 488.7 | 4 | 122.2 | 26.2 |
| 9 | 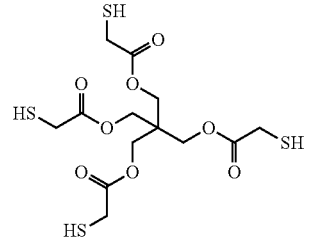<br>Pentaerythritol tetra(mercaptoacetate) | 432.6 | 4 | 108.2 | 29.6 |

TABLE 2

| | Isocyanate compound | Molecular weight (MW) | No. of functional groups (F) | Equivalent (EQ) |
|---|---|---|---|---|
| 1 | 1,6-diisocyanatohexane | 168.2 | 2 | 84.1 |
| 2 | Hydrogenated m-xylene diisocyanate | 194.2 | 2 | 97.1 |
| 3 | m-xylene diisocyanate | 188.2 | 2 | 94.1 |
| 4 | 1,3,5-tris(6-isocyanatohexyl)-1,3,5-triazinane-2,4,6-trione | 504.6 | 3 | 168 |

Example 1: Preparation of a Plastic Optical Lens

Preparation of a Polymerizable Composition 56 parts by weight of a first polythiol compound (polythiol compound No. 2) and 56 parts by weight of a second polythiol compound (polythiol compound No. 9) were mixed as a polythiol compound. 109.8 parts by weight of hydrogenated m-xylene diisocyanate (isocyanate compound No. 2) was added thereto and uniformly mixed. 0.01 part by weight of dibutyltin dichloride as a polymerization catalyst, 0.1 part by weight of Zelec® UN as an internal mold release agent, and 0.2 part by weight of Seesorb@ 709 as a UV stabilizer were added thereto and uniformly mixed to thereby prepare a polymerizable composition.

Preparation of a Plastic Lens

The polymerizable composition was degassed at 600 Pa for 1 hour and then filtered through a Teflon filter of 3 μm. The filtered polymerizable composition was injected into a glass mold assembled with an adhesive tape. The mold was heated from 25° C. to 120° C. at a rate of 5° C./min, and the polymerization was carried out at 120° C. for 18 hours. Thereafter, the cured resin in the glass mold was further cured at 130° C. for 4 hours, and the molded article (or a plastic lens) was then released from the glass mold.

Examples 2 to 5 and Comparative Examples 1 to 3

The same procedure as in Example 1 was carried out to prepare plastic lenses, except that the kinds and/or amounts of the polythiol compound and the isocyanate compound were changed as shown in Table 3 below.

TABLE 3

| Component (No./part by weight) | | Comp. Example | | | Example | | | | |
|---|---|---|---|---|---|---|---|---|---|
| | | 1 | 2 | 3 | 1 | 2 | 3 | 4 | 5 |
| Polythiol compound | First polythiol compound | No. 1/ 77.0 | No. 3/ 47.9 | No. 4/ 73.9 | No. 2/ 56 | No. 6/ 50.2 | No. 3/ 50.1 | No. 6/ 51.2 | No. 7/ 67.6 |
| | Second polythiol compound | No. 5/ 210.1 | No. 5/ 179.9 | No. 5/ 180.8 | No. 9/ 56 | No. 8/ 67.0 | No. 8/ 70.6 | No. 9/ 60.5 | No. 9/ 60.2 |
| Isocyanate compound | | No. 1/ 108.7 | Nos. 3, 4/ 52.1, 93.1 | No. 3/ 104.7 | No. 2/ 109.8 | No. 2/ 106.5 | No. 2/ 112.3 | No. 3/ 105.3 | No. 3/ 104.7 |

Test Example: Property Measurement

The properties of the polymerizable compositions thus prepared were measured according to the methods described below. The measurement results are shown in Table 4 below.

(1) Storage Modulus and KEL

The plastic lenses prepared in Examples 1 to 5 and Comparative Examples 1 to 3 were each subjected to a dynamic mechanical thermal analysis at 4° C./min and 1 Hz using a dynamic mechanical thermal analyzer (DMA Q800) to obtain a storage modulus at 25° C. (E' (@ 25° C.)), a storage modulus at 70° C. (E' (@ 70° C.)), and tan δ. The ratio of the storage modulus at room temperature (25° C.) to the storage modulus at 70° C. (E' (@ 25° C.)/E' (@70° C.) and the energy attenuation (KEL) at room temperature (25° C.) according to the following Equation 1 were calculated from the above values.

$$KEL \text{ (energy attenuation)} = \tan \delta \times 10^{12}/[E'(@25° C.) \times (1+(\tan \delta)^2)] \quad \text{[Equation 1]}$$

(2) Glass Transition Temperature (Tg, ° C.)

The plastic lenses prepared in Examples 1 to 5 and Comparative Examples 1 to 3 were each measured for the glass transition temperature (Tg) with TMA Q400 (TA Co.) under the penetration method (a load of 50 g, a pin line of 0.5 mm Φ, a temperature elevation rate of 10° C./min).

(3) Impact Resistance

The plastic lenses prepared in Examples 1 to 5 and Comparative Examples 1 to 3 were each fixed. Then, a steel ball of 16 g was dropped from a height of 127 cm to observe whether the lens was damaged such as broken or cracked. If the surface of the lens was cracked or the lens was broken, it was evaluated as Fail. If the surface was good without breakage, it was evaluated as Pass.

(4) Thermal Resistance (Heat Distortion)

The molded articles prepared in Examples 1 to 5 and Comparative Examples 1 to 3 were each made to five ISO 75 standard specimens (length×width×thickness=80 mm×10 mm×4 mm). They were each subjected to a heat distortion analysis using a heat deformation tester (HDT, heat distortion temperature, HD-PC, Yasuda Co.). If it was deformed at 90° C. or higher, it was evaluated as Pass. If it was deformed at 90° C. or lower, it was evaluated as Fail.

TABLE 4

|  | Comp. Example | | | Example | | | | |
| --- | --- | --- | --- | --- | --- | --- | --- | --- |
|  | 1 | 2 | 3 | 1 | 2 | 3 | 4 | 5 |
| E' (@ 25° C.) | 1,700 | 2,110 | 1,900 | 2,010 | 2,100 | 1,700 | 2,310 | 2,400 |
| E' (@ 25° C.)/ E' (@ 70° C. | 46 | 39 | 34 | 3.7 | 2.9 | 3.5 | 1.9 | 1.7 |
| KEL (1/Pa, 25° C.) | 73 | 69 | 59 | 17 | 15 | 16 | 15 | 16 |
| Tg (° C.) | 61 | 57 | 66 | 101 | 105 | 107 | 106 | 110 |
| Impact resistance | Pass | Pass | Pass | Pass | Pass | Pass | Pass | Pass |
| Thermal resistance | Fail | Fail | Fail | Pass | Pass | Pass | Pass | Pass |

As can be seen from Table 4 above, most of the polythiourethane-based plastic lenses prepared in Examples 1 to 5 had a lower storage modulus at room temperature (25° C.) and a lower ratio of the storage modulus at room temperature (25° C.) to the storage modulus at 70° C. than those of the polythiourethane-based plastic lenses prepared in Comparative Examples 1 to 3. The KEL values calculated from them were remarkably low as well. In addition, the lenses of Examples 1 to 5 had a higher glass transition temperature than that of the lenses of Comparative Examples 1 to 3. Further, the lenses of Examples 1 to 5 were excellent in impact resistance and thermal deflection, whereas the lenses of Comparative Examples 1 to 3 were poor in thermal distortion although they were excellent in impact resistance.

The invention claimed is:

1. A polythiourethane-based plastic lens obtained from a polymerizable composition comprising a bi- or higher-functional polythiol compound and a bi- or higher-functional isocyanate compound,
   wherein the lens has (i) a ratio of the storage modulus at room temperature (25° C.) to the storage modulus at 70° C. of 1 to 10,
   (ii) a storage modulus at room temperature (25° C.) of 100 to 3,000 MPa,
   (iii) an energy attenuation (KEL) at room temperature (25° C.) according to the following Equation 1 of 1 to 50, and
   (iv) a glass transition temperature (Tg) of 70 to 160° C.:

$$KEL \text{ (energy attenuation)} = \tan \delta \times 10^{12}/[E'(@25° C.) \times (1+(\tan \delta)^2)] \quad \text{[Equation 1]}$$

in the above Equation, E' (@ 25° C.) is the storage modulus at room temperature (25° C.), and tan δ is the ratio of the loss modulus to the storage modulus at room temperature (25° C.),
   wherein the polythiol compound comprises a first polythiol compound and a second polythiol compound different from the first polythiol compound,
   wherein the first polythiol compound has a weight average molecular weight of 220 to 1,500 g/mole and is bi-functional to tetra-functional,
   wherein the second polythiol compound, which has an ester group at the terminal, has a weight average molecular weight of 400 to 3,000 g/mole and is bi-functional to tetra-functional,
   wherein the isocyanate compound is at least one selected from the group consisting of 1,3-bis(isocyanatomethyl) cyclohexane, m-xylene diisocyanate, and 1,3,5-tris(6-isocyanatohexyl)-1,3,5-triazinane-2,4,6-trione, and
   wherein the polythiol compound comprises 45 to 70 parts by weight of the first polythiol compound and 50 to 75 parts by weight of the second polythiol compound, based on the total weight of the polythiol compound.

2. The polythiourethane-based plastic lens of claim 1, wherein the first polythiol compound is at least one selected from the group consisting of glycol di(3-mercaptopropionate), 4-mercaptomethyl-1,8-dimercapto-3,6-dithiaoctane, trimethylolpropane tri(3-mercaptopropionate), 4,8-di(mercaptomethyl)-1,11-dimercapto-3,6,9-trithiaundecane, 5,9-di(mercaptoethyl)-1,12-dimercapto-3,7,10-trithiadodecane, and wherein the second polythiol compound is at least one selected from the group consisting of pentaerythritol tetra(3-mercaptopropionate), pentaerythritol tetra(mercaptoacetate), and

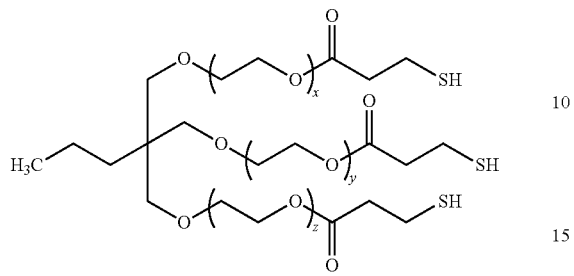

(x, y, and z are each independently an integer from 1 to 10, and x+y+z=20).

3. The polythiourethane-based plastic lens of claim 1, wherein the isocyanate compound further comprises at least one selected from the group consisting of isophorone diisocyanate, 1,6-diisocyanatohexane, and
bis(4-isocyanatocyclohexyl)methane.

4. The polythiourethane-based plastic lens of claim 1, wherein the polymerizable composition comprises the polythiol compound and the isocyanate compound at a molar ratio of 20:80 to 80:20.

* * * * *